United States Patent
Faris

Patent Number: 5,459,591
Date of Patent: Oct. 17, 1995

[54] ELECTROMAGNETIC ENERGY BEAM STEERING DEVICES

[76] Inventor: Sadeg M. Faris, 24 Pocantico River Rd., Pleasantville, N.Y. 10570

[21] Appl. No.: 207,662

[22] Filed: Mar. 9, 1994

[51] Int. Cl.$^6$ .................... G02F 1/13; G02F 1/1335; H04N 9/12
[52] U.S. Cl. .................. 359/37; 359/40; 348/740
[58] Field of Search .................. 359/37, 38, 40, 359/45, 65, 94; 348/740, 759, 771

[56] References Cited

U.S. PATENT DOCUMENTS

| | | | |
|---|---|---|---|
| 3,679,290 | 7/1972 | Adams et al. | 350/157 |
| 4,578,709 | 3/1986 | Lang et al. | 358/230 |
| 4,592,628 | 6/1986 | Altman et al. | 350/486 |
| 4,639,788 | 1/1987 | Glenn | 358/233 |
| 4,670,744 | 6/1987 | Buzak | 340/716 |
| 5,214,420 | 5/1993 | Thompson et al. | 340/795 |
| 5,221,982 | 6/1993 | Faris | 359/93 |
| 5,235,443 | 8/1993 | Barnik et al. | 359/37 |

*Primary Examiner*—Anita Pellman Gross
*Assistant Examiner*—Charles Miller
*Attorney, Agent, or Firm*—Thomas J. Kilgannon, Jr.

[57] ABSTRACT

The present invention relates to beam steering and scanning devices which utilize an imaging cell which incorporates a solid-state cholesteric liquid crystal (CLC) element, an electronically controlled, variable half-wave retarder and a source of circularly polarized light. The CLC element is disposed at an angle (45°) relative to the path along which light from the source is projected and is designed to reflect, at a given wavelength, one circular polarization of light and transmit the other. Using this characteristic, light of one polarization or the other is presented to the variable retarder and depending on whether or not it is actuated, light is either diverted into another orthogonal path or remains in the original path. If another similar imaging cell is disposed in the orthogonal path, light incident on that cell can also be diverted into yet another path or transmitted along the orthogonal path under control of a half-wave retarders associated with said another imaging cells. By arranging a plurality of imaging cells in the form of an array and accessing each row of the cells of the array with a column of similar imaging cells and by selectively activating half-wave retarders associated with each of the cells, monochromatic or polychromatic light from a single source or multiple sources may be steered to a selected cell and reflected from its associated CLC element or elements. Utilizing successive cells in the array and causing reflection of a modulated beam or beams provides a frame in the manner of the usual TV set which is viewed by the eyes as an integrated picture. Successive frames, of course, provide the usual moving images.

50 Claims, 3 Drawing Sheets

ELECTROMAGNETIC ENERGY BEAM STEERING DEVICES

BACKGROUND OF THE INVENTION

1. FIELD OF THE INVENTION

The present invention relates generally to devices for beam steering and scanning and, more particularly, to devices for beam steering and scanning which are electronic in character in that they incorporate no electromechanical or acousto-optical devices. The devices include an imaging cell which incorporates a solid-state cholesteric liquid crystal (CLC) element, a half-wave retarder and a source of circularly polarized light. The half-wave retarder is electronically controllable and converts electromagnetic energy (light) of one circular polarization to the other circular polarization when actuated and is disposed in the path of light emitted from the source. The CLC element is disposed at an angle (45°) relative to the same light path and is designed to reflect light of one circular polarization and wavelength and transmit light of the other circular polarization at the same wavelength. When the source emits light of the other polarization and the half-wave retarder is unactuated, the CLC element transmits the resulting beam. When light of the other polarization is emitted and the half-wave retarder is actuated, the CLC element reflects the resulting beam of one polarization into a path which is orthogonal to the original path. By placing another of the above described imaging cells, for example, in the orthogonal path and incorporating a CLC element which is reflective of the other circular polarization at a 45° angle in the orthogonal path, upon actuation of a half-wave retarder, the one polarization is converted to the other polarization and reflected into still another path by the CLC element.

By providing an array of the above described imaging cells and selectively accessing each of the rows of such an array with a column of similar cells and by selectively actuating the half-wave retarders associated with each column of the imaging cells, monochromatic or polychromatic light from single or multiple sources may be diverted to a selected cell and reflected from its CLC element or elements which are designed to reflect at a selected wavelength or wavelengths. In this way, electromagnetic energy may be steered or scanned without invoking any electromechanical or electroacoustic expedients. To the extent that scanning is achieved in a manner which eliminates large deflection angles, the long sought for flat-panel display is achieved utilizing the devices of the present invention.

2. Description of the Prior Art

Generally, there are two well-known techniques for the steering and scanning of light beams. One is electromechanical and the other is acousto-optical. Both techniques have severe limitations. One such limitation is that arrangements incorporating these techniques require a large volume due to the small angle through which the light beam can be deflected. Thus, if it is desired to scan a length B, the deflection arrangement has to be positioned a distance, A, providing an A/B ratio larger than 1.

All known systems require an A/B ratio larger than 1 and to the extent that the arrangement of the present application can provide A/B ratios which are very much less than 1, the resulting structure may also be characterized as a flat-panel display. In the known scanning approaches, scanning speed is relatively sluggish due to the use of electromechanical or electro-acoustic elements. Because such devices are eliminated in the scanning arrangement of the present application, scanning speeds in the microsecond range are achievable.

U.S. Pat. 4,670,744 filed Mar. 14, 1985 and issued Jun. 2, 1987 in the name of T. Buzak incorporates variable optical retarders and liquid crystal chiral cells. This reference takes advantage of the reflective and transmissive characteristics of chiral cells as well as the ability of variable optical retarders to convert one circular polarization to the other circular polarization. However, when a beam containing image information is projected along a given path in which the chiral cells and retarders are disposed, the beam remains in that given path or is retroreflected along the same path. Opposed to this, the arrangements of the present application while they all incorporate the reflection-transmission characteristics of chiral cells, they all incorporate an ability to divert the reflected beams into other paths. To the extent that the Buzak reference seek to provide a three-dimensional display, all the images reflected must lie in a plane parallel to the planes of the chiral cells. Otherwise distortion and degradation of the reflected images would occur due to the required lateral displacement of the chiral cells. In other words, to provide the desired result, no diversion of the beam in the Buzak reference can be tolerated.

U.S. Pat. No. 5,221,982, filed Jul. 5, 1991 and issued on Jun. 22, 1993 to S. M. Faris is entitled Polarizing Wavelength Separator. The patent relates to a polarizing wavelength separating optical element in the form of a flat panel which causes each of a plurality of polychromatic optical beams from a source, entering at one surface and transmitted to another surface, to be converted, with high conversion efficiency, into circularly polarized, spectrally and spatially separated beams. The element is made of a periodic array of cells; each of the latter incorporating a plurality of subcells. One subcell functions as a broadband reflector, while each of the remaining subcells acts as a polarizing, wavelength selective reflector. Each subcell comprises a plurality of layers which are bonded together at their surfaces and are oriented at a 45° angle relative to the horizontal surfaces of the panel. In each subcell, the plurality of layers comprise two cholesteric liquid crystal, CLC films, which reflect at a selected wavelength, at least one optical retarder and clear substrates which provide mechanical support. The thicknesses of the supporting substrates are designed to cause the beams transmitted through the element to be spatially separated by appropriate distances. In the reference, all the elements utilized in the panel are passive in character which constrain beams of electromagnetic energy into paths which are fixed for all time. In contradistinction to this, the present application, with it electronically controllable retarders, provides paths for electromagnetic energy which can be changed from instant-to-instant taking advantage of both the transmissive and reflective capabilities of CLC elements. The combination of a circularly polarized input with controllable retarders and associated CLC elements in the present invention provides the ability to scan a beam from point to point in a panel-like display or to steer a beam it can emanate from any location on an array of imaging cells. Strictly passive arrays with their fixed paths cannot achieve these results.

SUMMARY OF THE INVENTION

The present invention relates to beam steering and scanning devices which utilize an imaging cell which incorporates a solid-state cholesteric liquid crystal (CLC) element, an electronically controlled, variable half-wave retarder and a source of circularly polarized light. The CLC element is disposed at an angle (45°) relative to the path along which light from the source is projected and is designed to reflect, at a given wavelength, one circular polarization of light and transmit the other. Using this characteristic, light of one polarization or the other is presented to the variable retarder and depending on whether or not it is actuated, light is either diverted into another orthogonal path by the CLC element or remains in the original path. If another similar imaging cell is disposed in the orthogonal path, light incident on that cell can also be diverted into yet another path or transmitted along the orthogonal path under control of a half-wave retarder associated with said another imaging cell.

By arranging a plurality of imaging cells in the form of an array and accessing each row of the cells of the array with a column of similar imaging cells and by selectively actuating half-wave retarders associated with each of the cells, monochromatic or polychromatic light from a single source or multiple sources may be steered to a selected cell and reflected from its associated CLC element or elements. Utilizing successive cells in the array and causing reflection of a modulated beam or beams, provides a frame in the manner of the usual TV set which is viewed by the eyes as an integrated picture. Successive frames, of course, provide the usual moving images.

It is, therefore, an object of the present invention to provide an imaging array which is essentially flat in character.

Another object is to provide an imaging array which incorporates no electromagnetic or electroacoustic scanning device.

Still another object is to provide a flat panel display in which the need for vacuum envelopes is eliminated.

The foregoing objects and features of the present invention will become apparent from the following more detailed description of preferred embodiments taken in conjunction with the accompanying drawings.

DETAILED DESCRIPTION OF PREFERRED EMBODIMENTS

Figure 1:
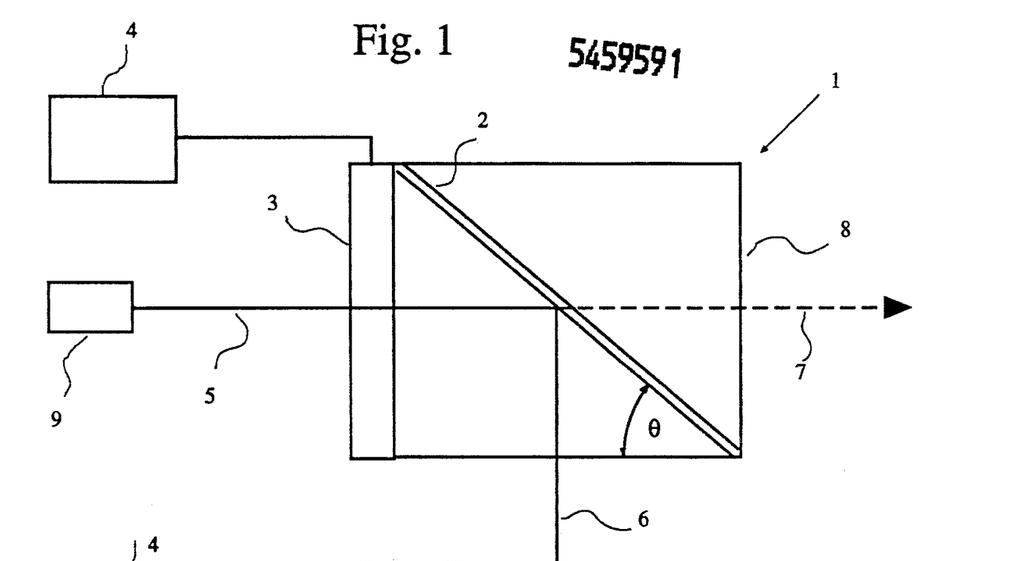
FIG. 1 is a partially schematic, top view of an electromagnetic energy transmission-reflection device in accordance with the teaching of the present invention which incorporates a cholesteric liquid crystal (CLC) element disposed at an angle with respect to a path along which circularly polarized electromagnetic energy is projected, a switchable one-half wave length retarder and a source of circularly polarized light.

FIG. 1 is a partially schematic, top view of an electromagnetic energy transmission-reflection device which incorporates a cholesteric liquid crystal (CLC) element disposed at an angle with respect to a path along which circularly polarized electromagnetic energy is projected, a switchable half-wave length retarder or π-cell and a source of circularly polarized electromagnetic radiation.

In FIG. 1, electromagnetic energy transmission-reflection device 1 (hereinafter referred to as imaging cell 1 ) includes a cholesteric liquid crystal element 2 (hereinafter referred to as CLC element 2), and a half-wave retarder 3 (hereinafter referred to as π-cell 3) activated from a pulsed source 4. CLC element 2 is shown disposed at an angle θ relative to a beam 5 of circularly polarized electromagnetic energy which, depending on whether or not π-cell 3 is activated, is either reflected from CLC element 2 along a path 6 or transmitted through CLC element 2 along a dashed line path 7 coincident with the direction of beam 5. CLC element 2 and π-cell 3 are held in the positions shown in FIG. 1 by a frame 8 the walls of which are transparent to electromagnetic energy in beam 5 emanating from a source 9 of such energy.

In FIG. 1, pulsed source 4 may be any source of pulsed voltage well known to those skilled in the electrical arts. Source 9 may be a laser or any other source of light the output of which may be converted from a linearly polarized orientation to circularly polarized by means of a quarter-wave plate (not shown) in a manner well known to those skilled in the optical arts. To the extent right or left-handed circularly polarized light is required, a half-wave plate or half-wave retarder (not shown) may be utilized if the output from the quarter-wave plate is not properly circularly polarized. In this manner, well known to those skilled in the optical arts, light of one circular polarization may be converted to the opposite circular polarization; Suffice it to say, therefore, for present purposes, that light or other electromagnetic radiation emanating from source 9 is circularly polarized in either a clockwise or counter-clockwise direction. Lasers, for example, which are commercially available may be utilized to provide outputs which fall within the visible spectrum or fall within the infrared or ultraviolet spectra. Indeed, as will be more fully explained in what follows, any source of electromagnetic radiation may be utilized provided the radiation is not so energetic that the various elements shown in FIG. 1 are invisible to it.

While source 9, in FIG. 1, is shown to be a single source, it should be appreciated that it also represents a plurality of sources each having a different wavelength. Thus, source 9 may include lasers which emit at the red, green and blue wavelengths of the visible spectrum so that beam 5 contains these components which may be then reflected along orthogonal path 6 as a beam of light having a single color or a combination of these wavelengths.

It should also be appreciated that source 9 may comprise lasers or other sources of electromagnetic radiation which are capable of being intensity modulated. In this way, a particular wavelength may be varied in intensity from zero to a maximum intensity including all the gradations in between.

Once circularly polarized beam 5 emanates from source 9, it encounters π-Cell 3 where, depending on whether or not pulsed source 4 is activated, beam 5 is either convened to the opposite circular polarization or retains the same circular polarization with which it entered imaging cell 1. As previously indicated, π-cell 3 converts electromagnetic radiation of a given wavelength or band of wavelengths from left-handed circular polarization to right-handed circular polarization or vice-versa. Half-wave retarders or π-cells of the type shown and described in U.S. Pat. No. 4,670,744, filed Mar. 14, 1985 and issued in the name of T. S. Buzak on Jun. 2, 1987 may be utilized in the practice of the present invention. This patent is herewith incorporated by reference. FIG. 6 of the patent shows a liquid crystal cell which is used as a zero to half-wave retarder. Alternatively, variable π-cells known as polarizing prisms or McNeill polarizing prisms may be utilized in the practice of the present invention and are commercially available. Where more than a single wavelength of electromagnetic radiation is used in the arrangement of FIG. 1, a plurality of π-cells may be utilized to provide half-wave retardation of each wavelength to maintain the same intensity levels for each wavelength. Accordingly, a plurality of π-cells may be substituted for π-cell 3 all of which are simultaneously pulsed from pulsed source 4 as appropriate. Otherwise, a single π-cell having a sufficiently broad bandwidth may be used.

Upon exiting from π-cell 3, beam 5 of circularly polarized electromagnetic radiation encounters cholesteric liquid element 2 which is designed to reflect beam 5 along path 6, if it has one circular polarization or transmit beam 5 along path 7 if it has the opposite circular polarization. CLC element 2 is disposed at angle θ with respect to the direction of beam 5. In FIG. 1, angle θ is preferably an angle of 45° but it may be another angle depending on the application. While CLC element 2 is shown in FIG. 1 as a single element, it should be understood that a plurality of CLC elements 2 may be substituted for element 2 to provide for the reflection and transmission of a plurality of wavelengths or band of wavelengths which are provided by a plurality of sources of electromagnetic radiation. CLC element 2, in FIG. 1 is a nematic liquid crystal with chiral additives or polysioxlane side-chain polymers which cause the cigar-shaped molecules to be spontaneously aligned in an optically active structure of either a left-handed or fight-handed helix with a helical pitch, P. The twisting direction and the pitch, P, of the helices are determined by the nature and concentration of the additives, respectively. A CLC film has all its helixes aligned in one direction and is capable of reflecting light, for example, having one circular polarization and a characteristic wavelength or band of wavelengths. CLC elements which may be used in the practice of the present invention and their method of fabrication are shown in U.S. patent application, U.S. Pat. No. 5,221,982, filed on Jul. 5, 1991 and issued on Jun. 22, 1993 in the name of S. M. Fads. This Patent is herewith incorporated by reference. In a similar vein, the liquid crystal chiral cells shown in the first mentioned U.S. Patent hereinabove may also be used in the practice of the present invention.

Using imaging cell 1 of FIG. 1, electromagnetic radiation reflected along path 6 appears as an intensity modulated beam of electromagnetic radiation. The beam may also vary in color depending on the number of sources 9 and the corresponding number of CLC elements 2 disposed within imaging cell 1. Electromagnetic energy projected along path 7 results from two situations. Either π-cell 3 is not activated from pulsed source 4 and the beam 5 is not properly circularly polarized or CLC element 2 has not been designed to reflect the wavelength transmitted along path 7. Recognizing this clearly shows that CLC element 2 is both polarization and wavelength selective.

In operation, imaging cell 1 is subjected to beam 5 of right-hand circularly polarized (RCP) light, for example, or other forms of electromagnetic radiation from a source 9. Beam 5 first encounters π-cell 3 which, in the absence of a pulse from pulsed source 4, passes unchanged to impinge on CLC element 2 which is disposed at an angle θ (preferably 45°) relative to the path of beam 5. Because CLC element 2 is designed to reflect only left-hand circularly polarized (LCP) radiation, for example, beam 5 which is still RCP passes through CLC element 2 along path 7. This occurs even though CLC element 2 is tuned to the wavelength of the incident radiation because CLC element 2 is selective to both polarization direction and to wavelength. Thus, in the absence of π-cell 3 being pulsed, imaging cell 1 appears to be transparent to RCP radiation at the wavelength of source 9. If, however, pulsed source 4 is pulsed and activates π-cell 3, radiation in beam 5 incident on π-cell 3 undergoes a 180° retardation and the incident RCP radiation is converted to LCP radiation upon exiting π-cell 3. Beam 5, now LCP, impinges on CLC element 2 from which it is reflected along path 6. This occurs because CLC element 2 is designed to reflect LCP radiation at the wavelength of source 9. In this way, radiation from source 9 is switched from one direction to another and an image of the source appears to an observer standing in path 6. Of course, if a plurality of CLC elements 2 tuned to different wavelengths are substituted for element 2 in FIG. 1 and a plurality of π-cells 3 are substituted for π-cell 3 in FIG. 1, a plurality of wavelengths may be reflected or transmitted along paths 6, 7, respectively.

As described above, the radiation provided by source 9 is RCP and CLC element 2 is reflective of LCP. If the radiation provided by source were LCP and CLC element 2 were reflective of RCP by design, the result would be the same, except the radiation in path 6 would be RCP and that in path 7 LCP.

Figure 2:
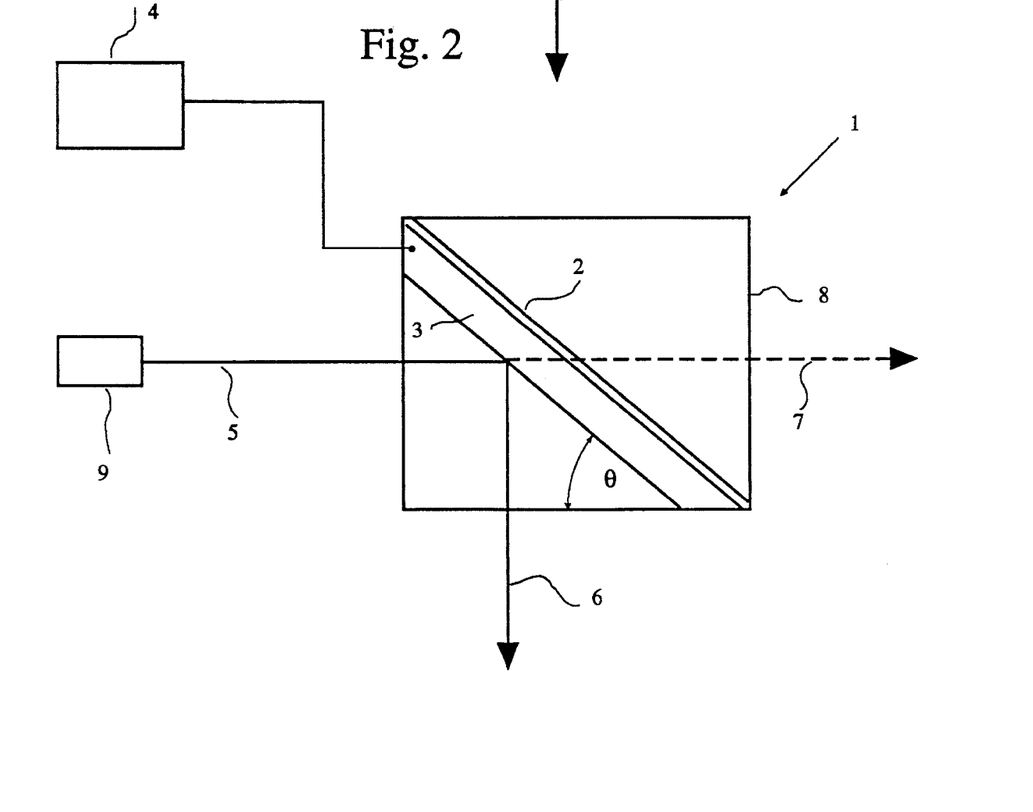
FIG. 2 is a partially schematic, top view of an imaging device which is identical with the arrangement shown in FIG. 1 except that the switchable half-wave retarder is shown as co-planar with the CLC element.

Referring now to FIG. 2, a partially schematic top view of imaging cell 1 of FIG. 1 is shown which is identical with the arrangement of FIG. 1 except that π-cell 3 is co-planar with CLC element 2 both of which are then disposed at the angle θ relative to the direction of beam 5. Radiation incident upon an angled π-cell 3 provides the same retardation regardless of its angle of incidence on π-cell 3. Apart from this, disposing CLC element 2 and π-cell 3 in a co-planar manner makes for simplicity of fabrication in that CLC element 2 may be mounted integrally on a surface of π-cell 3 using an adhesive or other holding means. Also, frame 8 may be fabricated using four transparent walls and a CLC element 2, π-cell 3 combination may be inserted or removed depending on the wavelength or wavelengths of the source 9 being used.

Figure 3:
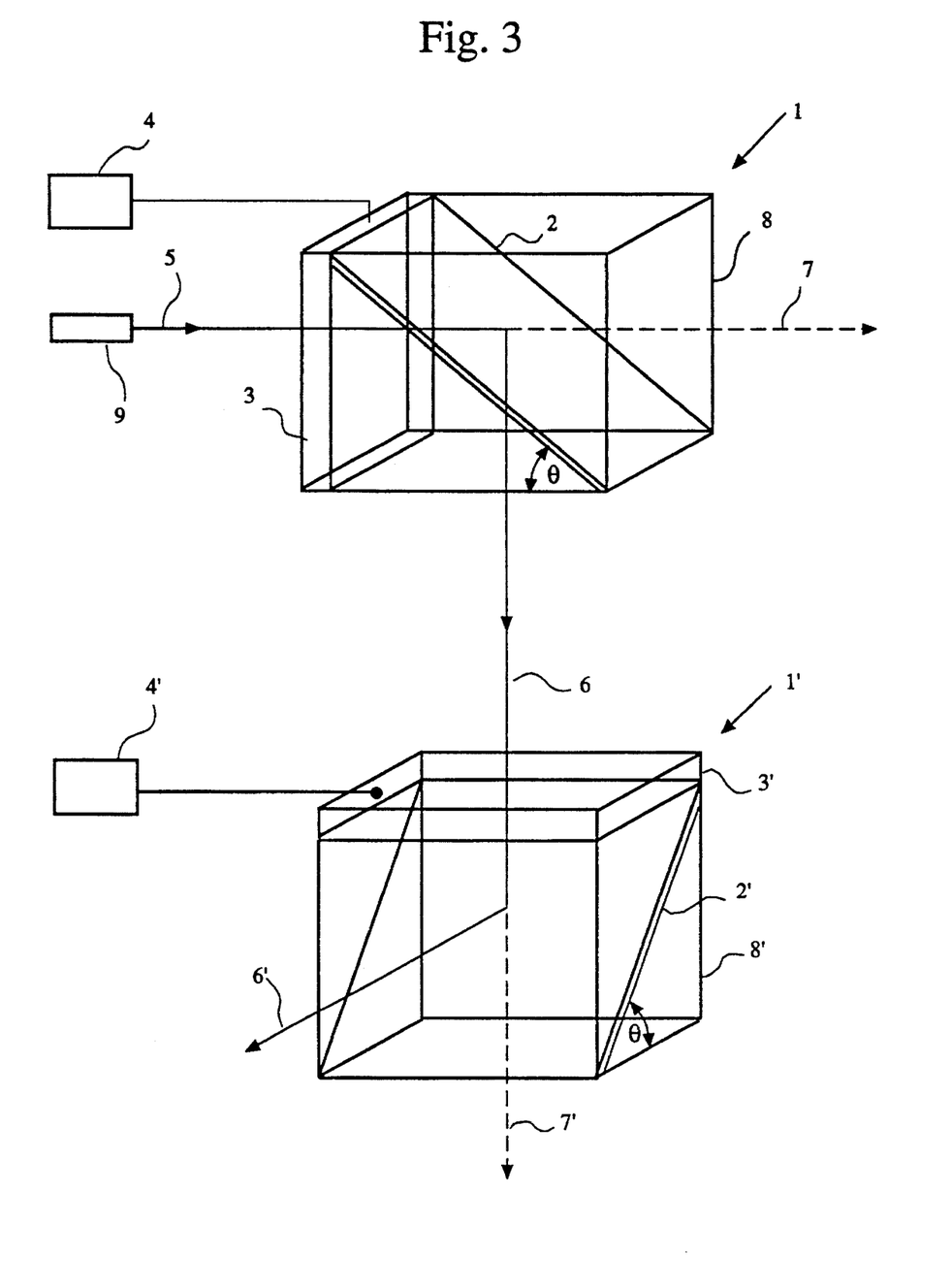
FIG. 3 is a perspective view of two imaging cells similar to that shown in FIG. 1 which are utilized to divert a light beam from a first path into second and third paths. By controlling the retardation of a light beam and using cholesteric liquid crystal (CLC) elements responsive to both polarization and wavelength, the light beam may be steered from its original path into other paths.

Referring now to FIG. 3, these is shown a perspective view of two imaging cells similar to that shown in FIG. 1 which are utilized to divert a light beam from a first path into second and third paths. By controlling the retardation of a light beam and using CLC elements responsive to both polarization and wavelength, the light beam may be directed from its original path into other paths.

In FIG.3, elements which are the same as the elements shown in FIG. 1 have been given the same reference characters. In addition, to distinguish the uppermost imaging cell in FIG. 3 from the lowermost imaging cell, the same elements in the lowermost cell have been shown with primed reference characters.

Imaging cell 1 in FIG. 3 is identical to that shown in FIG. 1 and functions in the same manner as described hereinabove in connection with that figure. Imaging cell 1' is similar except that CLC element 2' is positioned differently relative to path 6. In FIG. 3, the light beam in path 6 is shown having two potential paths. If π-cell 3' is not activated by a pulse from source 4', light passes unhindered though CLC element 2' from imaging cell 1. If π-cell 3' is activated by a pulse from source 4', the light in path 6 in passing though π-cell 3' undergoes a 180° phase retardation and is reflected from CLC element 2' which has been designed to reflect light of a given polarization and wavelength. As previously indicated, the 180° phase retardation changes the polarization of the light in path 6 to the opposite polarization permitting that light to be reflected from CLC element 2' into path 6'. If the polarization and wavelength are not proper, light in path 6 will pass unaffected through CLC element 2' along-path 7'.

Considering FIG. 3 in somewhat more detail and assuming that left-hand circularly polarized (LCP) light has been reflected from CLC element 2 in the same manner as described above in connection with FIG. 1, LCP light in path 6, first encounters π-cell 3' of imaging cell 1'. If π-cell 3' is not activated from pulsed source 4', light in path 6, now LCP, passed though CLC element 2' along path 7' because CLC element 2' has been designed to reflect only right-hand circularly polarized (RCP) light at a given wavelength. If, however, pulsed source 4 is activated, LCP light in path 6 undergoes a 180° phase retardation to RCP light as it passes through π-cell 3' and is reflected as RCP light along path 6'.

Using the arrangement shown in FIG. 3, it should be clear that using only two imaging cells 1,1', light may be diverted into a second path by one imaging cell and into a multiplicity of paths using a second imaging cell. For example, by simply rotating imaging cell 1', a light beam in path 6' can be made to scan a circular path. Similarly, by tilting imaging cell 1' up and down, light in path 6' may be scanned in elevation.

As with the arrangement of FIG. 1, a plurality of modulated light sources 9, a plurality of π-cells 3,3' and a plurality of CLC elements 2, 2' may be utilized to divert polychromatic light in any desired direction.

Figure 4:
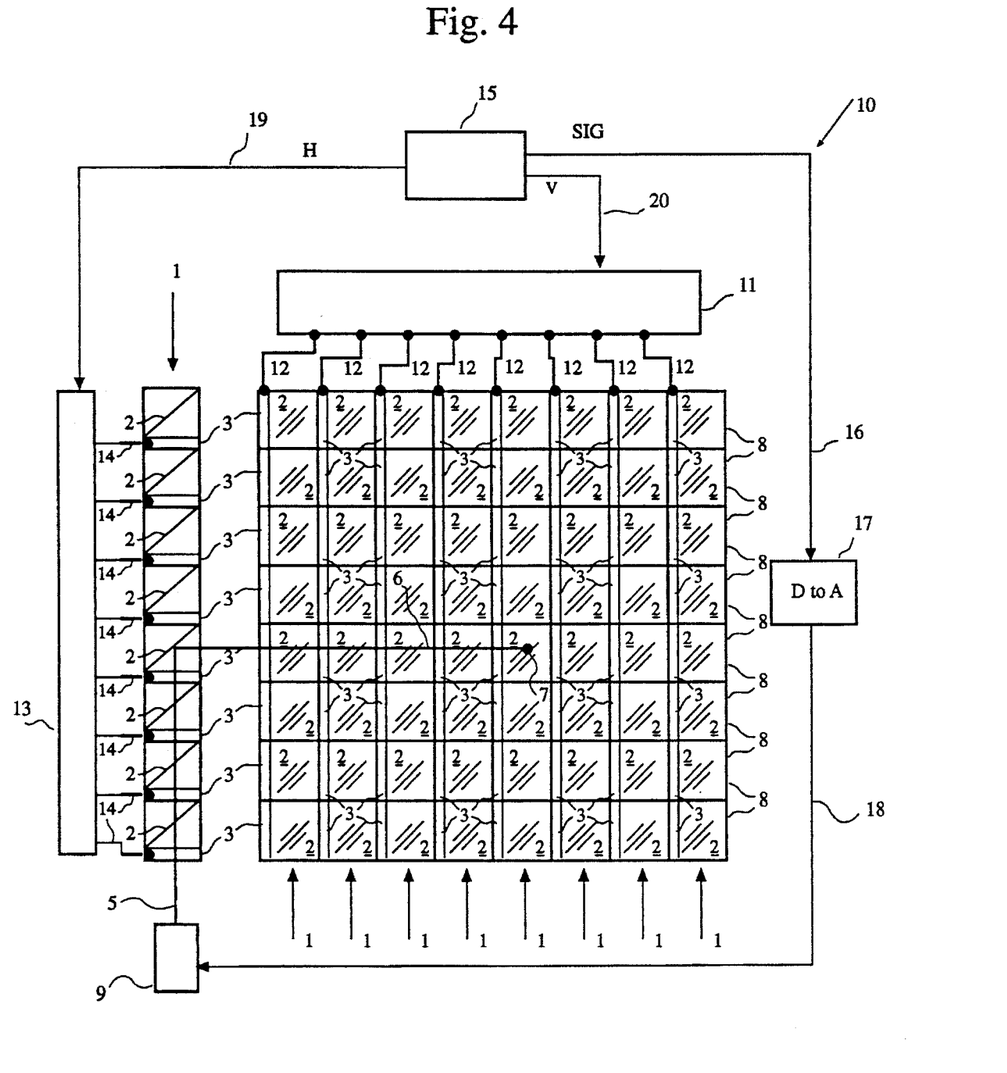
FIG. 4 is a partially schematic, block diagram of a scanning system which permits electromagnetic energy (light) to be emitted from any one of an array of imaging cells like those shown in FIGS. 1, 2. Steering or scanning of a light beam is accomplished by activating row and column half-wave switchable retarders in conjunction with the CLC elements of devices like those shown in FIGS. 1 and 2 which are both polarization and wavelength selective.

Once the flexibility obtained by the arrangement of FIG. 3 is recognized, it becomes clear that imaging cells 1 place seriatim in path 7 and imaging cells 1 placed seriatim in path 6 may be utilized to control a light beam's position so that it is emitted from any selected point on a planar face in the manner shown in FIG. 4.

Referring now to FIG. 4, there is shown a partially schematic, block diagram of a scanning system which permits electromagnetic radiation (light) to be emitted from any one of an array of imaging cells like those shown in FIGS. 1, 2. Steering or scanning of a light beam is accomplished by activating half-wave retarders or π-cells which determine which imaging cell in an array will emit light. By selecting a π-cell in a column of imaging cells, a light beam is diverted into an orthogonal path along a row of imaging cells by the CLC element associated with the selected π-cell. To select a specific imaging cell in the array, at least one π-cell in a selected column is energized and light passing through one of the π-cells in the column is appropriately polarized so that it is reflected in to a second orthogonal path from the appropriately polarized CLC element. In exiting from the selected imaging cell, the light has undergone two polarization changes clearly indicating that the input and output circular polarization's are the same. This follows from the requirement that the polarization of the input light must be such that each imaging cell must be transparent to the impinging light until its associated π-cell is selected. From this, it further follows that the CLC elements must be capable of reflecting a circular polarization opposite to the circular polarization of the light entering an imaging cell.

Examining FIG. 4 in more detail, scanning system 10 includes a plurality of imaging cells 1 arranged in the form of an array of cells like that shown in FIG. 1. Block 11 represents a plurality of column drivers which are designed to apply appropriate voltages via interconnections 12 to π-cells 3. Each column driver activates all the π-cells 3 in its associated column, or each driver could drive one continuous π-cell which is as long as the column. Block 13 represents a plurality of row drivers which are designed to apply appropriate voltages via interconnections 14 to π-cells 3 of associated imaging cells 1. The row drivers of block 13 activate a single π-cell 3 thereby permitting light impinging on its associated CLC element 2 to be reflected. Block 15 represents electronic circuitry which provides electrical outputs H, V to actuate the row and column drivers, respectively, and a modulated signal, SIC, which is to be displayed by system 10 as a modulated light beam is scanned across each row in sequence. To the extent that such outputs are available from commercially available television sets, VCR's and the like and since their generation form no part of the present invention, they will not be discussed in further detail. Suffice to say that providing such inputs is well within the skill of practitioners in the television arts.

In FIG. 4, interconnection 16 delivers modulated signal, SIG, to a digital-to-analog converter represented by block 17 in FIG. 3. Where signal, SIC, is amplitude modulated already, digital-to analog converter 17 need not be included. The resulting signal, SIG, is then applied to source 9 via interconnection 18 modulating the output beam 5 in intensity. As indicated previously, source 9 may be a laser with a monochromatic output or it may be a plurality of lasers the outputs of which, when combined, provide a polychromatic output. Also, as previously indicated, π-cells 3 associated with imaging cells 1 are designed to apply one-half wave retardation to a circularly polarized input. To the extent a single π-cell 3 is unable to provide half-wave retardation over a broad band at the same intensity level, a plurality of retarders tuned to the desired wavelength may be utilized. These π-cells 3 would be serially arranged and simultaneously activated from their row or column drivers.

In operation, scanning system 10 is set up so that beam 5 from source 9 is arranged to be right-hand circularly polarized (RCP). As previously indicated, this is accomplished in a well known manner using a combination of quarter-wave and half-wave length plates. Because all of the imaging cells 1 in the path of beam 5 must be transparent to beam 5 until a cell 1 is selected by applying a voltage to a π-cell 3 from row driver block 13, all CLC elements 2 in path 5 must be transparent to RCP light. This transparency is achieved during fabrication of elements 3 by making the platelets incorporated therein reflective of only left-hand circularly polarized (LCP) fight at the wavelength of source 9. If, in FIG. 4, beam 5 of RCP light is to be reflected to impinge on the fourth row from the bottom of imaging cells 1, a signal H from block 15 is applied via interconnection 19 to block 13 of row drivers from which a voltage is applied to the fourth π-cell 3 from the bottom which converts the impinging RCP beam 5 to LCP. Beam 5, now LCP, may be reflected, in a scanning fashion, from each of imaging cells 1 in the selected fourth row. Accordingly, each CLC 2 element in path 6 must be transparent to LCP until it is desired to reflect the light beam from any of cells 1 in the selected fourth row. Again, this is achieved by designing CLC elements 2 during fabrication to be transparent to LCP light and reflect only RCP light. In this way, LCP light passes through each imaging cell in the fourth row until a signal, V, from electronics block 15, via-interconnection 20, switches all the π-cells 3 in a column so that LCP light impinging on a switched π-cell 3 converts that light to RCP. The RCP light is then reflected from the selected imaging cells 1 into path 7 which, in FIG. 4, is in the plane perpendicular to the plane of the page. Thus, by accessing π-cells 3 and imaging cells 1 of the array sequentially and reflecting modulated light, an image may be constructed on array 10 which is analogous in every way to a black and white or color television picture without the use of the picture tube usually required. The size of the picture obtainable using this approach is limited only by the length of time the eye can retain an image. If really huge images are required, separate portions of the desired image can be generated simultaneously by separate arrays. Apart from the foregoing features, the most impressive feature of the present application is the minimum thickness with which array 10 can be fabricated. Array 10 can be truly hung on a wall like a picture and any image moving or otherwise can be generated. The elimination of vacuum envelopes, and moving electron beams with their heavy deflection equipment makes the present approach the long sought for solution to the problem of providing truly flat-panel displays. Apart from the foregoing, the present approach has application in any area which utilizes images of any kind like signage. An array, like that shown in FIG. 4, may be fabricated that electronically steers an input beam, for example, from the vertical to a horizontal position so that it scans distance L=PN, where P is the period of the linear array of imaging cells 1 and N is the number of imaging cells 1 in a row. The values of P and N may be chosen depending on the application. For example, if it is desired to scan 10 cm with a 1 mm diameter beam, then P is equal to 1 mm diameter beam and N is equal to 100. The thickness dimension (T) of array 10 in FIG. 4 is also about 1 mm, thereby achieving a thickness ratio much less than 1. Fabrication of the arrangement of FIG. 4 is relatively straightforward and simple particularly when it is appreciated that the prior art vacuum tube has been eliminated along with any electromechanical or electroacoustic devices.

I claim:

1. An imaging cell comprising means for projecting electromagnetic energy having a first polarization state and at least a given wavelength along a first path, controllable steering means interposed in said first path responsive to said first polarization state for maintaining said electromagnetic energy in said first path and responsive to a polarization state different from said first polarization for directing said electromagnetic energy into a second path, and, another controllable steering means interposed in said second path responsive to said polarization state different from said first polarization state for maintaining said electromagnetic energy in said second path and responsive to said first polarization state for directing said electromagnetic energy into a third path.

2. An imaging cell according to claim 1, wherein said means for projecting includes a laser and means for convening the output there of to said first polarization state optically coupled to said laser.

3. An imaging cell, according to claim 1, wherein said means for projecting includes a plurality of lasers each of which projects electromagnetic energy at at least a different wavelength and means for convening the outputs thereof to said first polarization state optically coupled to said lasers.

4. An imaging apparatus according to claim 1 wherein said means for projecting includes at least a single laser which can be modulated.

5. An imaging cell according to claim 1 wherein said controllable steering means includes switchable means for converting said first polarization state to said polarization state different from said first polarization state.

6. A imaging apparatus according to claim 5 further including means connected to said switchable means for actuating said switchable means.

7. An imaging cell according to claim 1 wherein said controllable steering means includes a layer of cholesteric liquid crystal material transmissive of said first polarization state and reflective of said polarization state different from said first polarization state disposed at an angle relative to said first path.

8. A imaging cell according to claim 7 wherein said angle is 45°.

9. An imaging cell according to claim 1 wherein said another controllable steering means includes other switchable means for converting said polarization state different from said first polarization state to said first polarization state.

10. An imaging cell according to claim 9 further including means connected to said other switchable means for actuating said other switchable means.

11. An imaging cell according to claim 1 wherein said another controllable steering means includes a layer of cholesteric liquid crystal material transmissive of said polarization state different from said first polarization state and reflective of said first polarization disposed at an angle relative to said second path.

12. An imaging cell according to claim 11 wherein said angle is 45°.

13. An imaging cell according to claim 1 wherein said another controllable steering means includes a layer of cholesteric liquid crystal material transmissive of said polarization state different from said first polarization state and reflective of said first polarization state disposed at an angle relative to said second path, and, switchable means for converting said polarization state different from said first polarization state to said first polarization state disposed in front of said layer of cholesteric liquid material.

14. An imaging cell according to claim 13 wherein said angle is 45°.

15. An imaging cell according to claim 13 wherein said layer and said switchable means for converting are co-planar and disposed at a 45° angle relative to said second path.

16. An imaging cell according to claim 1 wherein said another diverting means include a layer of cholesteric liquid crystal material transmissive of said polarization state different from said first polarization state and reflective of said first polarization state disposed at an angle relative to said second path, and, an actuable phase shifter disposed in said second path for phase shifting said polarization state different from said first polarization state between 0° and 180°.

17. An imaging cell according to claim 16 wherein said angle is 45°.

18. An imaging cell according to claim 16 wherein said layer and said actuable phase shifter are co-planar and disposed at a 45° angle relative to said second path.

19. An imaging apparatus according to claim 1 wherein said controllable steering means includes a layer of cholesteric liquid crystal material transmissive of said first polarization state and reflective of said polarization state different from said first polarization disposed at an angle relative to said first path, and, switchable means for converting said first polarization state to said polarization state different from said first polarization disposed in front of said layer of cholesteric liquid crystal material.

20. An imaging cell according to claim 19 wherein said angle is 45°.

21. An imaging cell according to claim 19 wherein said layer and said switchable means for converting are co-planar and disposed at a 45° angle relative to said first path.

22. An imaging apparatus according to claim 1 wherein said controllable steering means includes a layer of cholesteric liquid crystal material transmissive of said first polarization state and reflective of said polarization state different from said first polarization state disposed at an angle relative to said first path, and an actuable phase shifter disposed in said first path for phase shifting said first polarization state between 0° and 180°.

23. An imaging cell according to claim 22 wherein said angle is 45°.

24. An imaging cell according to claim 22 wherein said layer and said actuable phase shifter are co-planar and disposed at a 45° angle relative to said first path.

25. Beam steering apparatus comprising:
   means for projecting a beam of electromagnetic energy having a first polarization state and at least a given wavelength along a first path, a first plurality of imaging cells interposed in said first path each of said first plurality including controllable steering means responsive to said first polarizing state for maintaining said beam in said first path and responsive to a polarization state different from said first polarization state for directing said beam into a second path associated with each of said first plurality of imaging cells, and, an array of second plurality of imaging cells arranged in rows and columns one row being interposed in each of said second paths each of said second plurality of imaging cells including other controllable steering means responsive to said polarization state different from said first polarization state for maintaining said beam in said second path and responsive to said first polarization state for directing said beam into a third path.

26. Beam steering apparatus according to claim 25 wherein said means for projecting includes at least a single laser which can be modulated.

27. Beam steering apparatus according to claim 25 wherein said mean for projecting includes a laser and means for converting the output thereof to said first polarization state optically coupled to said laser.

28. Beam steering apparatus according to claim 25 wherein said means for projecting includes a plurality of lasers each of which projects a beam of electromagnetic energy at at least a different wavelength and means for converting the outputs thereof to said first polarization state optically coupled to said lasers.

29. Beam steering apparatus according to claim 25 wherein each said controllable steering means includes a layer of cholesteric liquid crystal material transmissive of said first polarization state and reflective of said polarization state different from said first polarization state disposed at an angle relative to said first path.

30. Beam steering apparatus according to claim 29 wherein said angle is 45°.

31. Beam steering apparatus according to claim 25 wherein each said other controllable steering means includes a layer of cholesteric liquid crystal material transmissive of said polarization state different from said first polarization state and reflective of said first polarization state disposed at an angle relative to said second path.

32. Beam steering apparatus according to claim 31 wherein said angle is 45°.

33. Beam steering apparatus according to claim 25 wherein each said controllable steering means includes switchable means for converting said first polarization state to a polarization state different from said first polarization state.

34. Beam steering apparatus according to claim 33 further including means connected to said switchable means for actuating said switchable means.

35. Beam steering apparatus according to claim 34 wherein said means for actuating includes a driver connected to said switchable means.

36. Beam steering apparatus according to claim 25 wherein each said controllable steering means includes a layer of cholesteric liquid crystal material transmissive of said first polarization state and reflective of said polarization state different from said first polarization state disposed at an angle relative to said first path, and, switchable means for converting said first polarization state to said polarization state different from said first polarization state disposed in front of said layer of cholesteric liquid crystal material.

37. Beam steering apparatus according to claim 36 wherein said angle is 45°.

38. Beam steering apparatus according to claim 36 wherein said layer and said switchable means for converting are co-planar and disposed at a 45° angle relative to said first path.

39. Beam steering apparatus according to claim 25 wherein each said controllable steering means includes a layer of cholesteric liquid crystal material transmissive of said first polarization state and reflective of said polarization state different from said first polarization state disposed at an angle relative to said first path, and, an actuable phase shifter disposed in said first path for phase shifting said first polarization state between 0° and 180°.

40. Beam steering apparatus according to claim 39 wherein said angle is 45°.

41. Beam steering apparatus according to claim 39 wherein said layer and said actuable phase shifter are co-planar and disposed at a 45° angle relative to said first path.

42. Beam steering apparatus according to claim 25 wherein each said other controllable steering means includes other switchable means for converting said polarization state different from said first polarization state.

43. Beam steering apparatus according to claim 40 further including means connected to said other switchable means for actuating said other switchable means.

44. Beam steering apparatus according to claim 43 wherein said means for actuating includes a driver connected to said other switchable means.

45. Beam steering apparatus according to claim 25 wherein each said other controllable steering means includes a layer of cholesteric liquid crystal material transmissive of said polarization state different from said first polarization state and reflective of said first polarization state disposed at an angle relative to said second path, and, switchable means for converting said polarization state different from said first polarization state to said first polarization state disposed in front of said layer of cholesteric liquid crystal material.

46. Beam steering apparatus according to claim 45 wherein said angle is 45°.

47. Beam steering apparatus according to claim 45 wherein said layer and said switchable means for converting are co-planar and disposed at a 45° angle relative to said second path.

48. Beam steering apparatus according to claim 25 wherein each said other controllable steering means includes a layer of cholesteric liquid crystal material transmissive of said polarization state different from said first polarizing state and reflective of said first polarization state and reflective of said first polarization state disposed at an angle relative to said second path, and, an actuable phase shifter disposed in said second path for phase shifting said polarization state different from said first polarization state between 0° and 180°.

49. Beam steering apparatus according to claim 48 wherein said angle is 45°.

50. Beam steering apparatus according to claim 48 wherein said layer and said actuable phase shifter are co-planar and disposed at a 45° angle relative to said second path.

* * * * *